(12) United States Patent
Ogura et al.

(10) Patent No.: US 8,989,384 B2
(45) Date of Patent: Mar. 24, 2015

(54) DIGITAL CINEMA MANAGEMENT DEVICE AND DIGITAL CINEMA MANAGEMENT METHOD

(75) Inventors: Misato Ogura, Kanagawa (JP); Katsumi Ogawa, Kanagawa (JP)

(73) Assignee: Sony Corporation (JP)

( * ) Notice: Subject to any disclaimer, the term of this patent is extended or adjusted under 35 U.S.C. 154(b) by 909 days.

(21) Appl. No.: 12/661,513

(22) Filed: Mar. 18, 2010

(65) Prior Publication Data

US 2010/0246826 A1 Sep. 30, 2010

(30) Foreign Application Priority Data

Mar. 27, 2009 (JP) .............................. P2009-079886

(51) Int. Cl.
*H04L 29/06* (2006.01)
*H04N 5/765* (2006.01)
*H04N 21/414* (2011.01)
*H04N 21/4627* (2011.01)
*H04N 21/482* (2011.01)

(52) U.S. Cl.
CPC ......... *H04N 5/765* (2013.01); *H04N 21/41415* (2013.01); *H04N 21/4627* (2013.01); *H04N 21/4826* (2013.01)
USPC .......................................... 380/277; 380/201

(58) Field of Classification Search
USPC .................................. 380/200, 201, 277–282
See application file for complete search history.

(56) References Cited

U.S. PATENT DOCUMENTS 5,812,669 A * 9/1998 Jenkins et al. ................ 713/161
6,812,994 B2 11/2004 Bubie et al.
7,034,916 B2 * 4/2006 Bubie et al. ...................... 352/40
7,236,227 B2 6/2007 Whyte et al.
7,373,657 B2 * 5/2008 Walker .............................. 726/4
2002/0056081 A1 * 5/2002 Morley et al. ..................... 725/1
2002/0122051 A1 * 9/2002 Hose et al. ...................... 345/716
2003/0007643 A1 * 1/2003 Ben-Zur et al. ............... 380/277
2003/0016821 A1 * 1/2003 Hammersmith ................ 380/37
2003/0048418 A1 * 3/2003 Hose et al. ..................... 352/123
2003/0048908 A1 * 3/2003 Hamilton ....................... 380/277
2003/0198347 A1 * 10/2003 Ribes et al. .................... 380/277
2005/0076372 A1 * 4/2005 Moore et al. .................... 725/78
2007/0204322 A1 8/2007 Whyte et al.
2008/0137869 A1 * 6/2008 Robert ........................... 380/278
2009/0119628 A1 * 5/2009 Lottmann ......................... 716/5
2009/0144542 A1 * 6/2009 Wetmore et al. .............. 713/156

FOREIGN PATENT DOCUMENTS

JP 2003-244625 A 8/2003
JP 2004-222245 A 8/2004
JP 2005-286561 A 10/2005

* cited by examiner

*Primary Examiner* — Yin-Chen Shaw
*Assistant Examiner* — John B King
(74) *Attorney, Agent, or Firm* — Lerner, David, Littenberg, Krumholz & Mentlik, LLP

(57) ABSTRACT

A digital cinema management device includes a control unit that manages keys used when exhibiting contents with playback devices and controls a representation of a management window for performing the key management, in which the control unit displays an arrangement representation in the management window and provides a representation at an arrangement position defined by a playback device and content exhibited by the playback device, the representation representing a status of a key used when decoding content corresponding to the arrangement position with a playback device corresponding to the arrangement position.

11 Claims, 15 Drawing Sheets

FIG. 6
| CONTENT STATUS | | ICON |
|---|---|---|
| CONTENT STATUS 1 | DATA OF CONTENT ARE STORED | 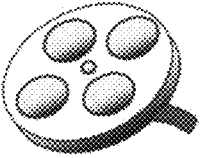 |
| | DATA OF CONTENT ARE NOT STORED | — |
| CONTENT STATUS 2 | DATA OF CONTENT ARE ENCRYPTED |  |
| | DATA OF CONTENT ARE NOT ENCRYPTED |  |

FIG. 7
| KDM STATUS | | ICON | |
| --- | --- | --- | --- |
| | | CENTRAL STORAGE | PLAYBACK DEVICE |
| KDM STATUS 1 | KEY IS PRESENT |  | 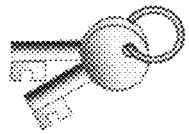 |
| | KEY IS NOT PRESENT | — | — |
| KDM STATUS 2 | KEY IS VALID AT THE CURRENT TIME |  | 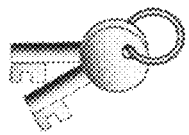 |
| | KEY IS NOT VALID AT THE CURRENT TIME |  | 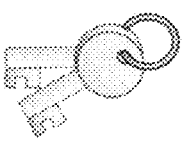 |
| KDM STATUS 3 | VALID PERIOD OF KEY IS WITHIN α HOURS |  | 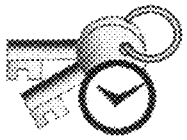 |
| | VALID PERIOD OF KEY IS LONGER THAN α HOURS |  | 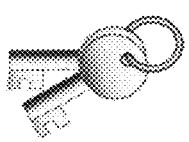 |
| | CURRENT TIME IS EARLIER THAN VALID PERIOD OF KEY |  |  |
| | VALID PERIOD OF KEY HAS BEEN EXPIRED |  |  |

| |
|---|
| +-- Mystic nature of Sea (DCP) |
| +-- Mystic nature...Eng (CPL1) |
| +-- Mystic natur...Eng (KDM) |
| +-- Mystic nature...Jpn (CPL2) |
| +-- Mystic natur...Jpn (KDM) |
| +-- Color's (DCP) |
| +-- Color's Eng (CPL1 3D)  |
| +-- Color's Eng (KDM) |
| +-- Car 3min (DCP) |
| +-- Car 3min Eng (CPL1) |
| +-- Car 3min Jpn (CPL2) |

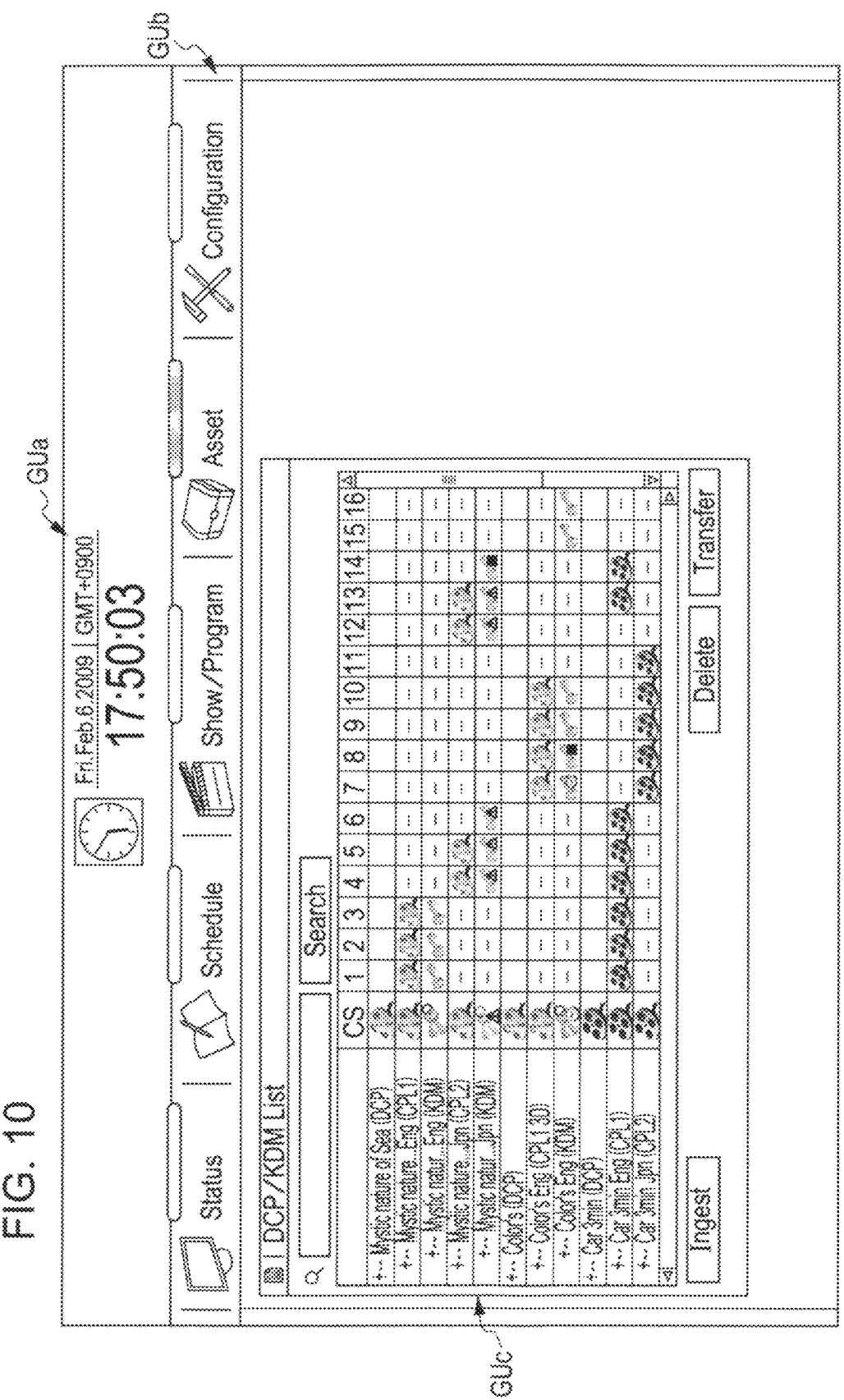

FIG. 11A

| THE NUMBER OF DAYS LEFT UNTIL EXHIBITION DAY | STATUS | URGENT LEVEL |
|---|---|---|
| CURRENT TIME IS WITHIN Md DAYS UNTIL EXHIBITION DAY OF EVENT | FATAL STATUS | 3 |
| CURRENT TIME IS WITHIN Nd DAYS UNTIL EXHIBITION DAY OF EVENT | ERROR STATUS | 2 |
| CURRENT TIME IS Nd DAYS OR EARLIER THAN EXHIBITION DAY OF EVENT | WARNING STATUS | 1 |

WHERE $Md < Nd$

FIG. 11B

| THE NUMBER OF DAYS LEFT UNTIL EXHIBITION DAY | STATUS | URGENT LEVEL |
|---|---|---|
| CURRENT TIME IS WITHIN Mk DAYS UNTIL EXHIBITION DAY OF EVENT | FATAL STATUS | 3 |
| CURRENT TIME IS WITHIN Nk DAYS UNTIL EXHIBITION DAY OF EVENT | ERROR STATUS | 2 |
| CURRENT TIME IS Nk DAYS OR EARLIER THAN EXHIBITION DAY OF EVENT | WARNING STATUS | 1 |

WHERE $Mk < Nk$

FIG. 12A

| NUMBER OF DAYS | 5 DAYS OR MORE BEFORE EXHIBITION DAY | BETWEEN 5 AND 2 DAYS BEFORE EXHIBITION DAY | BETWEEN 2 AND 1 DAYS BEFORE EXHIBITION DAY | 1 DAY BEFORE EXHIBITION DAY | EXHIBITION STARTING DAY |
|---|---|---|---|---|---|
| URGENT LEVEL | URGENT LEVEL 1 → | URGENT LEVEL 2 → | URGENT LEVEL 3 → | | |
| IDEAL STATUS OF CONTENT | ALTHOUGH IT IS OK FOR CONTENT NOT ARRIVING AT THEATER, IT WILL BECOME NECESSARY AFTERWARDS | CONTENT IS COPIED TO CENTRAL STORAGE DURING THIS PERIOD | CONTENT IS COPIED TO STORAGE OF EXHIBITION DEVICE DURING THIS PERIOD | | |

FIG. 12B

| NUMBER OF DAYS | 3 DAYS OR MORE BEFORE EXHIBITION DAY | BETWEEN 3 AND 2 DAYS BEFORE EXHIBITION DAY | BETWEEN 2 AND 1 DAYS BEFORE EXHIBITION DAY | 1 DAY BEFORE EXHIBITION DAY | EXHIBITION STARTING DAY |
|---|---|---|---|---|---|
| URGENT LEVEL | URGENT LEVEL 1 → | URGENT LEVEL 2 → | URGENT LEVEL 3 → | | |
| IDEAL STATUS OF KEY | ALTHOUGH IT IS OK FOR KEY NOT ARRIVING AT THEATER, IT WILL BECOME NECESSARY AFTERWARDS | KEY IS COPIED TO CENTRAL STORAGE DURING THIS PERIOD | KEY IS COPIED TO STORAGE OF EXHIBITION DEVICE DURING THIS PERIOD | | |

FIG. 14

| STATUS | URGENT LEVEL | BACKGROUND COLOR |
|---|---|---|
| FATAL STATUS | 3 | (RED) |
| ERROR STATUS | 2 | (ORANGE) |
| WARNING STATUS | 1 | (YELLOW) |

DIGITAL CINEMA MANAGEMENT DEVICE AND DIGITAL CINEMA MANAGEMENT METHOD

CROSS-REFERENCE TO RELATED APPLICATION

The present application claims priority from Japanese Patent Application No. JP 2009-079886 filed in the Japanese Patent Office on Mar. 27, 2009, the entire content of which is incorporated herein by reference.

BACKGROUND OF THE INVENTION

1. Field of the Invention

The present invention relates to a digital cinema management device and a digital cinema management method. More particularly, the present invention relates to a technique of making it easy to identify a status of a key used for decoding data of content that is scheduled for exhibition.

2. Description of the Related Art

With the progress of digital technology, the environment of the movie industries is converting from film to digital signals, and movies are produced using video equipment and played using a projector and the like. For realization of such a digital cinema, a data compression technique, an encryption technique for copyright protection, and the like are used in addition to picture and sound techniques for a faithful representation of images and sound intended by a producer.

When movies are shown on screens, data of a certain format created by a server installed in a movie distribution company are provided to individual theaters, and the data provided to the individual theaters are played with playback devices, whereby exhibition of a digital cinema is carried out. As the format of the data provided from the movie distribution company to the individual theaters, a format is used, for example, which is called a Digital Cinema Package (DCP), and which is compliant with the specifications proposed by the Digital Cinema Initiatives (DCI).

Japanese Unexamined Patent Application Publication No. 2003/244625 discloses a technique of transmitting data regarding the schedules for movies to be exhibited to an exhibition server unit and transmitting the contents of the movies to a cinema server so that the operations of editing or reorganizing the contents to be exhibited and creating the exhibition schedule can be performed by a single operation on a screen display.

SUMMARY OF THE INVENTION

However, the data of contents which are provided to the individual theaters from the movie distribution company are encrypted in order to prevent illegal access, copying, editing, and playback. For this reason, a key for use in decoding the encrypted data has to be acquired ahead of content exhibition. However, when the number of auditoriums increases, it is difficult to manage whether or not keys have been acquired ahead of the content exhibition.

It is therefore desirable to provide a digital cinema management device and a digital cinema management method capable of easily identifying an acquisition status of keys for use in decoding encrypted contents.

According to an embodiment of the present invention, there is provided a digital cinema management device including a control unit that manages keys used when exhibiting contents with playback devices and controls a representation of a management window for performing the key management, in which the control unit displays an arrangement representation in the management window and provides a representation at an arrangement position defined by a playback device and content exhibited by the playback device, the representation representing a status of a key used when decoding content corresponding to the arrangement position with a playback device corresponding to the arrangement position.

In the embodiment of the present invention, the control unit manages the keys used when exhibiting contents with the playback devices. The control unit displays, on the management window for managing the keys, an arrangement representation in which one of the playback devices and the contents exhibited by the playback devices is used as column items, and the other is used as row items, for example. The control unit displays a representation at an arrangement position defined by a playback device and content exhibited by the playback device, the representation representing the status of a key used when decoding content corresponding to the arrangement position with a playback device corresponding to the arrangement position. For example, the representation is displayed as an icon so that at least one of a key acquisition status and a status regarding a key valid period can be identified. Moreover, when a valid key necessary for exhibition of contents is not present, the control unit determines an urgent level based on the number of days left until an exhibition day and switches the properties (e.g., a background color) of a representation at an arrangement position defined by content for which a valid key is not present and a playback device that exhibits the content in accordance with the urgent level. Furthermore, when a representation representing a key status is selected, the control unit displays a valid period of a key corresponding to the selected representation.

According to another embodiment of the present invention, there is provided a digital cinema management method including the steps of causing a display unit to display a management window for managing keys used when decoding contents with playback devices; and causing a control unit to display an arrangement representation in the management window and provide a representation at an arrangement position defined by a playback device and content exhibited by the playback device, the representation representing a status of a key used when decoding content corresponding to the arrangement position with a playback device corresponding to the arrangement position.

According to the embodiments of the present invention, an arrangement representation is displayed in the management window for managing keys used when exhibiting contents, and a representation is provided at an arrangement position defined by a playback device and content exhibited by the playback device, the representation representing the status of a key used when decoding content corresponding to the arrangement position with a playback device corresponding to the arrangement position. Therefore, it is easily possible to identify the status or the like of keys for decoding encrypted contents.

BRIEF DESCRIPTION OF THE DRAWINGS

FIG. 6 is a diagram illustrating icons used when displaying a content status.

FIG. 7 is a diagram illustrating icons used when displaying a KDM status.

FIG. 10 is a diagram illustrating a DCP/KDM list representation.

FIGS. 11A and 11B are diagrams illustrating check tables.

FIGS. 12A and 12B are diagrams illustrating determination results of an urgent level.

FIG. 14 is a diagram illustrating switching of representation properties based on an urgent level.

DESCRIPTION OF THE PREFERRED EMBODIMENTS

Figure 1:
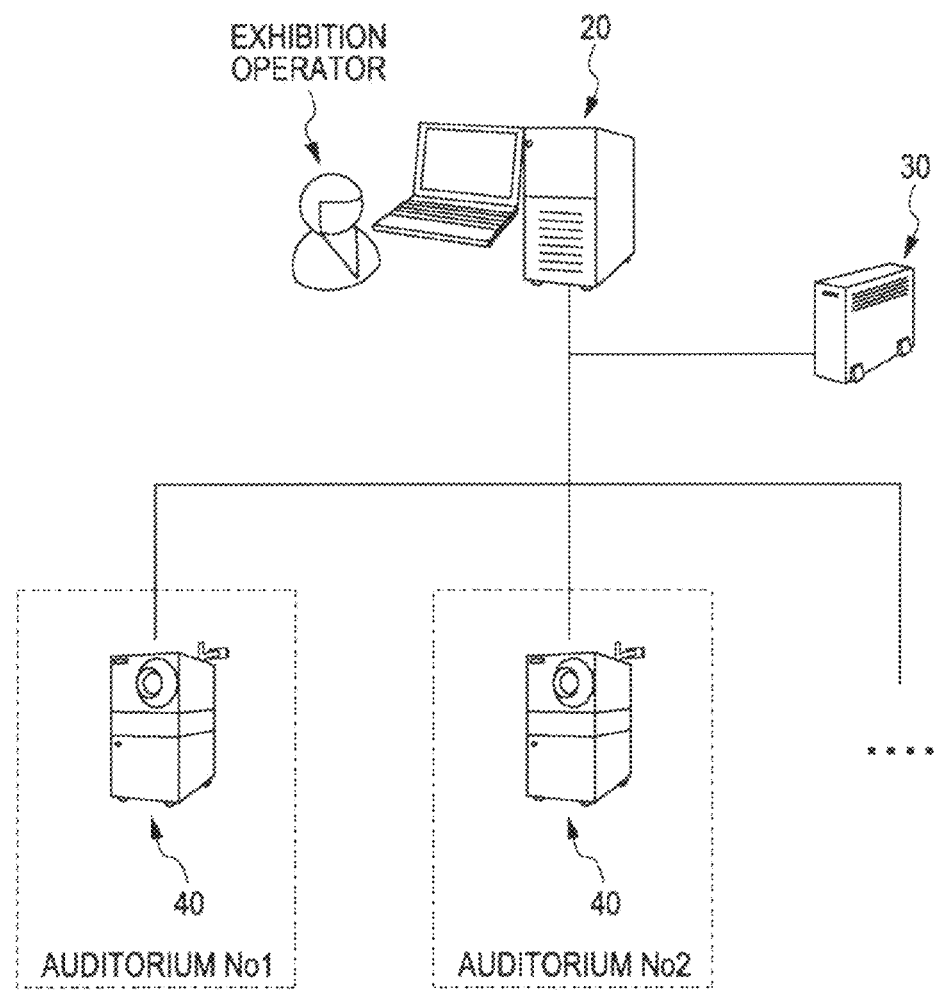
FIG. 1 is a diagram illustrating a schematic configuration of a digital cinema system.

Hereinafter, preferred embodiments of the present invention will be described. The description will be given in the following order:

1. Configuration of Digital Cinema System;
2. Structure of Digital Cinema Package (DCP);
3. Configuration of Management Device and Playback Device; and
4. Operation of Management Device 1. Configuration of Digital Cinema System FIG. 1 illustrates a schematic configuration of a digital cinema system. A digital cinema system 10 is configured by using a digital cinema management device (hereinafter referred to as a "management device") 20, a central storage device (hereinafter referred to as a "storage device") 30, and a playback device 40 which is installed in each auditorium.

The management device 20 creates the schedules for contents to be exhibited by the playback device 40. Moreover, the management device 20 reads data of the contents exhibited by the playback device 40 from the storage device 30 and supplies the data to the playback device 40.

The storage device 30 stores the data and the like of the contents exhibited by the playback device 40. The storage device 30 may be a storage device that uses redundant arrays of inexpensive disks (RAID), for example.

The playback device 40 includes a content storage unit, a decoding unit, a projector, a sound output unit, and the like. The playback device 40 supplies the data of contents stored in the content storage unit to the decoding unit according to a schedule. The decoding unit decodes the data of contents to obtain data of pictures and subtitles and outputs them to the projector. Moreover, the decoding unit decodes the data of contents to obtain data of sound and outputs them to the sound output unit. In this way, exhibition of a digital cinema can be carried out by the playback device 40 that is installed in an auditorium.

The management device 20 is connected to a theater ticketing system (not illustrated) that provides an exhibition schedule to newspapers or other sources ahead of a scheduled exhibition day. The exhibition schedule includes information on events representing which movies will be exhibited on which day and time and in which auditorium. The management device acquires the information on the events from the theater ticketing system to create schedules.

For example, the management device 20 creates the schedules using a show template. The management device 20 displays a show template. An exhibition operator sets cinema advertisement (theater advertisements), trailers (movie announcements), and main features of movies according to the show template. For example, when a format, called a Digital Cinema Package (DCP), is used, a composition playlist CPL described later or a program containing a group of composition playlists CPLs is set in the show template. The use of such a show template facilitates the scheduling operation of the exhibition operator.

Here, an exhibition of one event based on the list set in the show template is referred to as a "show." Moreover, the lists set in the show template are collectively referred to as a "show playlist". That is to say, a show of one event is presented by performing playback or the like of data based on the show playlist. Furthermore, by correlating events with the show playlist, a show can be presented at the time of each event by performing playback or the like of data based on the show playlist at the time described in the events. During the show, the lighting, the screen size, and the like are controlled.

In addition, the format used with the digital cinema system 10 is not limited to the Digital Cinema Package DCP (hereinafter referred to as "DCP"), but an MPEG format may be used for a cinema advertisement, for example.

In addition, content data are often encrypted in order to prevent illegal access, copying, editing, and playback. In this case, a key for use in decoding the encrypted data has to be acquired ahead of content exhibition. For example, a Key Delivery Message (KDM) is defined in the specifications proposed by the Digital Cinema Initiatives (DCI). The Key Delivery Message (KDM) is a message that provides permission for content exhibition and a right to provide information necessary for the exhibition to a particular theater. Therefore, when data in the DCP format, for example, are exhibited with the playback device 40 to perform content exhibition, the management device 20 stores the KDM in the playback device 40 ahead of the content exhibition. By doing so, the content can be exhibited with the playback device 40 even when content data are encrypted.

2. Structure of Digital Cinema Package (DCP)

Figure 2:
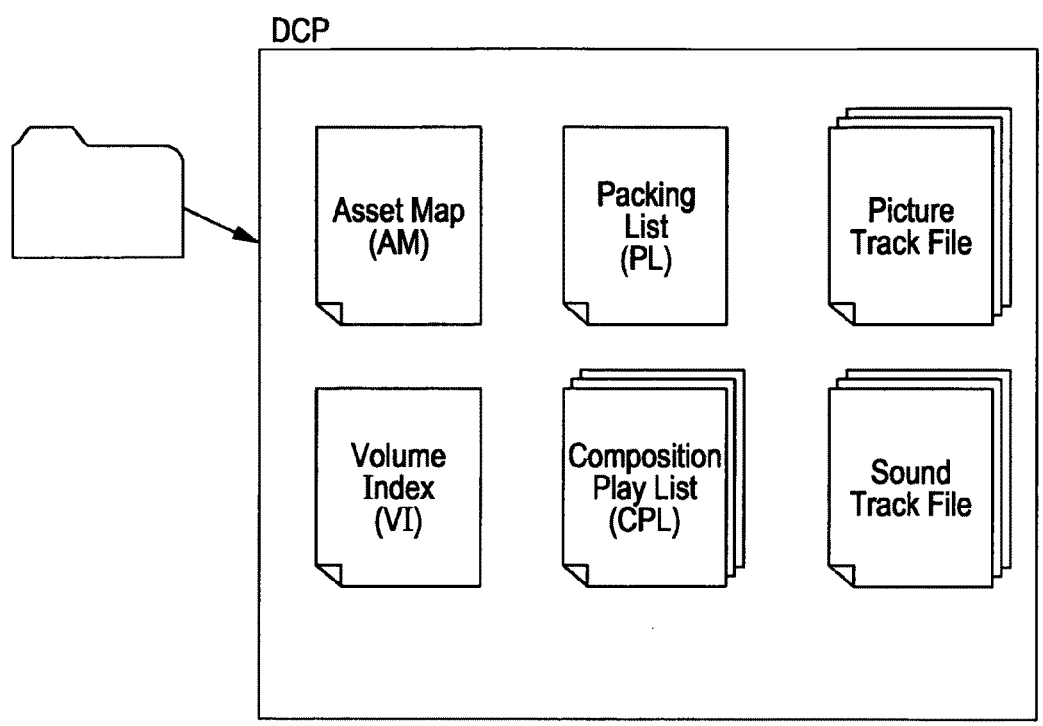
FIG. 2 is a diagram illustrating a file structure of a DCP.

Next, a file structure of a typical DCP will be described. FIG. 2 is an explanatory diagram illustrating the file structure of a typical DCP.

Contents of a digital cinema are distributed in a data format called a DCP, which is compliant with the specifications proposed by the Digital Cinema Initiatives (DCI). The DCP is a set of various types of data files necessary for exhibition of a digital cinema.

As illustrated in FIG. 2, for example, a DCP includes an asset map (AM), a volume index (VI), a packing list (PL), and a composition playlist (CPL). The DCP further includes a picture track file, a sound track file, and the like. Each of these files has assigned thereto globally unique identification information, such as a universal unique identifier (UUID), and the UUID of each file is described in the file. Now, the files constituting the DCP will be described below.

Asset Map (AM)

An asset map describes a list regarding all the files (except the asset map itself) included in one DCP. More specifically, the asset map describes a list that associates the UUIDs described in the individual files in the DCP with the file names of the files. The asset map can be used, for example, for enabling users to identify the individual files included in the DCP. The asset map is created for each digital cinema, and even when the DCP is divided as will be described later, only one asset map that is common to a plurality of divided DCPs is created for one digital cinema. A subtitle PNG file described later has a format such that it is unable to describe a UUID therein. Therefore, by describing the file names of individual PNG files in the asset map to be correlated with the UUIDs thereof, it is possible to associate the individual PNG files with their UUIDs.

Volume Index (VI)

A volume index describes index information for identifying individual divided units in a case where a DCP is divided into a plurality of divided units (divided DCPs).

Packing List (PL)

A packing list describes a list that correlates the UUIDs of all the files (except the PL itself) included in one DCP with their hash values. The hash values are values obtained by hashing data of the individual files in the DCP. The hash values of individual files described in the packing list are compared with hash values of the individual files which are actually calculated, thus checking the degree of coincidence, whereby the integrity (e.g., whether or not data have been corrupted) of the individual files can be verified.

Composition Play List (CPL)

A composition playlist (hereinafter referred to as a "CPL") is a playlist used for exhibition of contents (pictures, sound, and subtitles) included in the DCP. The CPL is link information that correlates picture track files and sound track files (and/or subtitle track files) corresponding to each exhibition version of a digital cinema with each other. The CPL is created for each exhibition version of one digital cinema.

The CPL describes the UUIDs, data entry points, and durations of the individual files for all the reels, the files including picture track files, which are picture files, sound files, and/or subtitle files. The reels herein refer to units that are formed by dividing, in time, one exhibition unit which includes picture and sound (and subtitles as necessary). For example, in a case where one digital cinema (120 minutes) is divided equally, in time, into 10 units, 10 reels (12 minutes each) are created. The entry points are offsets representing exhibition start points of data of picture or sound files of the individual reels. The durations are size information representing the valid ranges of data from the entry points.

In a case where one digital cinema is composed of a plurality of reels, the CPL describes information regarding all the reels (UUIDs of picture, sound, and subtitle files constituting the individual reels, and entry points and durations thereof), and all the reels constitute one unit of playing. Usually, a digital cinema is composed of a plurality of reels, so that reel information regarding all the reels is described together in one CPL.

An exhibition version refers to one exhibition unit of a digital cinema, such as a language version (e.g., an English-sound version, a Japanese-sound version, or a Japanese-subtitle version). The CPL is created for each exhibition version of one digital cinema.

Picture Track File

A picture track file is a file of picture data compressed according to a predetermined format. The picture track file is provided in a number corresponding to a necessary number of reels. Furthermore, a plurality of types of picture files (e.g., a picture file for an original version and a picture file for a replacement version) may be created for the same scene.

Sound Track File

A sound track file is a file of sound data compressed according to a predetermined format. The sound track file is provided in a number corresponding to a necessary number of reels. Furthermore, a plurality of types of sound files (e.g., a sound file for an original version and a sound file for a replacement version) may be created for the same scene.

The DCP also includes files (not illustrated) for subtitle representation.

3. Configuration of Management Device and Playback Device

Figure 3:
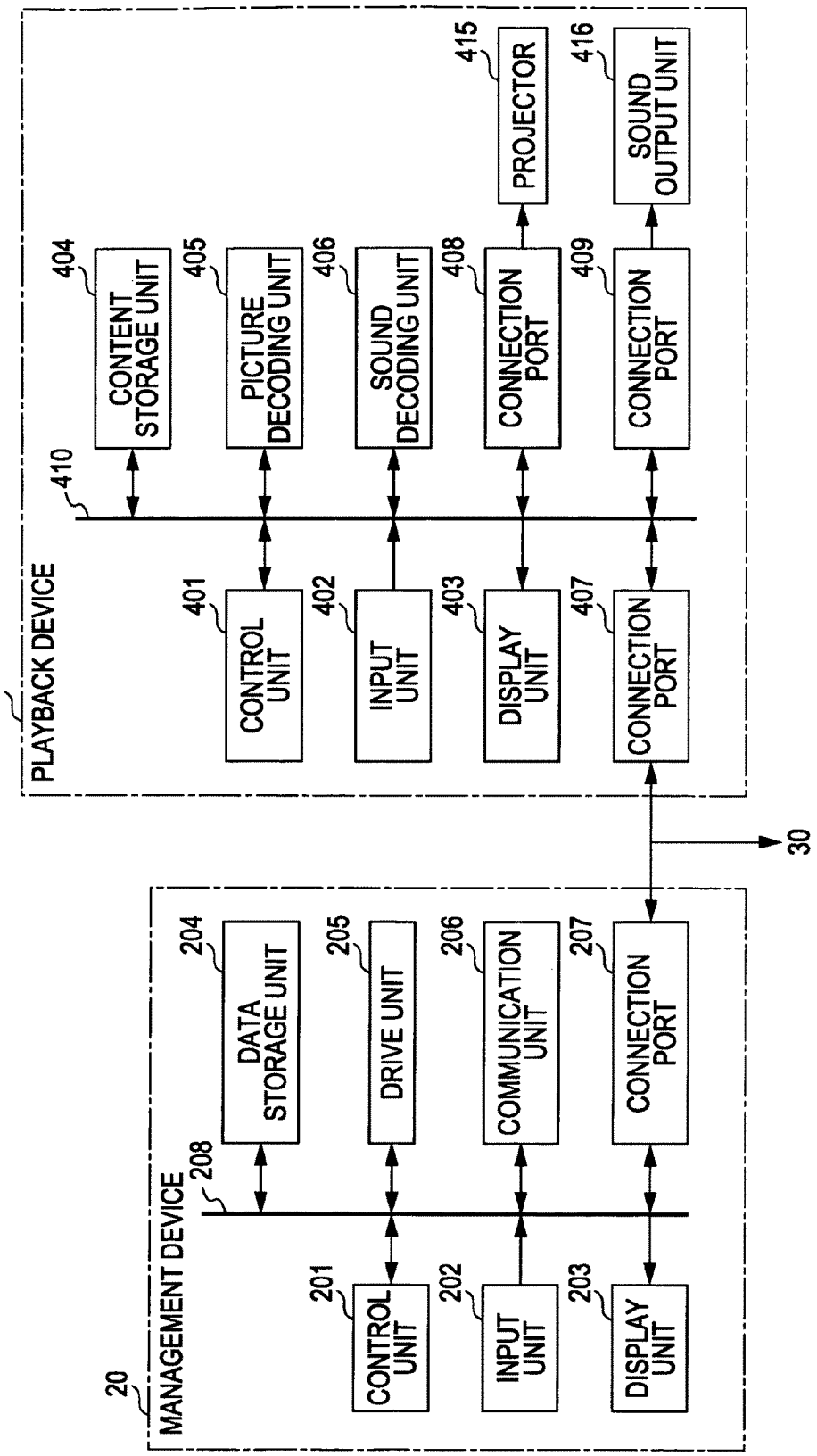
FIG. 3 is a diagram illustrating a configuration of a management device and a playback device.

FIG. 3 is a diagram illustrating a configuration of the management device 20 and the playback device 40.

The management device 20 includes a control unit 201, an input unit 202, a display unit 203, a data storage unit 204, a drive unit 205, a communication unit 206, a connection port 207, and a local bus 208 for connecting the units to each other.

The control unit 201 is configured by using a CPU, a ROM, and a RAM. The CPU executes programs stored in the ROM or programs loaded to the RAM from the data storage unit 204, thereby executing various types of processing in accordance with a user's operation based on operation signals from the input unit 202 described later. For example, the control unit 201 creates schedules and executes processing for causing the playback device 40 to perform exhibition of contents in accordance with the schedules. Moreover, the control unit 201 causes a management window for managing keys used when exhibiting contents with the playback device 40 to be displayed on the display unit 203 described later. Furthermore, the control unit 201 displays an arrangement representation in the management window and provides a representation at an arrangement position defined by the playback device 40 and the content exhibited by the playback device 40, the representation representing the status of a key used when decoding content corresponding to the arrangement position with the playback device 40 corresponding to the arrangement position.

The ROM of the control unit 201 stores programs used by the CPU, calculation parameters, and the like. The RAM temporarily stores programs used for the execution by the CPU, parameters that change appropriately during execution of the programs, and the like.

The input unit 202 is configured by using, for example, a mouse, a keyboard, a touch panel, a button, a switch, and a lever. The input unit 202 outputs an operation signal in accordance with a user's operation on the input unit 202 to the control unit 201. The user can input various types of data to the management device 20 or instruct the management device 20 to perform processing operations by operating the input unit 202.

The display unit 203 is configured by using a display device such as a liquid crystal display (LCD). For example, the display unit 203 displays a management window or the like for managing exhibition operations performed by individual playback devices 40 of the digital cinema system.

The data storage unit 204 is configured by using, for example, a hard disk, a solid state drive (SSD), and the like. The data storage unit 204 stores various types of data, such as, for example, programs executed by the control unit 201, schedule information, logs, and show playlists.

The drive unit 205 writes or reads various types of data to/from a removable recording medium. For example, the drive unit 205 reads various types of data, such as, for example, material content of digital cinemas, DCPs, and configuration information which are recorded on the recording medium.

The communication unit 206 is a communication interface that is configured by, for example, a communication device for connecting the management device 20 to an external apparatus via a wireless or wired communication path. The management device 20 transmits/receives various types of data to/from the external apparatus via the communication unit 206. For example, the management device 20 receives data and the like of contents.

The connection port 207 is a port for connecting the management device 20 and the storage device 30 or the playback device 40 to each other. By connecting the storage device 30 or the playback device 40 to the connection port 207, various types of data can be communicated between the management device 20 and the storage device 30 or the playback device 40.

The management device 20 is not limited to the configuration illustrated in FIG. 3, but may have a configuration that the display unit is provided separately from the management device. Moreover, the drive unit and the like may be provided separately from the management device.

The playback device 40 includes a control unit 401, an input unit 402, a display unit 403, a content storage unit 404, a picture decoding unit 405, a sound decoding unit 406, connection ports 407, 408, and 409, and a local bus 410 for connecting the units to each other. The playback device 40 further includes a projector 415 and a sound output unit 416.

The control unit 401, the input unit 402, and the display unit 403 have substantially the same functional configuration as the control unit 201, the input unit 202, and the display unit 203 of the management device 20, respectively. The control unit 401 controls the respective units based on the schedule information or the like supplied from the management device 20 to perform exhibition of contents in accordance with the schedules.

The content storage unit 404 stores data of content to be exhibited. When picture data of content are compression encoded data, the picture decoding unit 405 decodes the compression encoded data. When sound data of content are compression encoded data, the sound decoding unit 406 decodes the compression encoded data. Moreover, when the picture or sound data are encrypted, the picture decoding unit 405 and the sound decoding unit 406 decrypts the encrypted picture or sound data by using a key provided from the management device 20.

The connection port 407 is a port for connecting the playback device 40 and the management device 20 or the storage device 30 to each other. With this connection port 407, various types of data can be communicated between the playback device 40 and the management device 20 or the storage device 30.

The connection port 408 is a port for connecting the projector 415. The connection port 409 is a port for connecting the sound output unit 416.

The projector 415 projects pictures of content on a screen based on picture data read from the content storage unit 404 or picture data decoded and/or decrypted by the picture decoding unit 405.

The sound output unit 416 is configured by using an amplifier, a speaker, and the like. The sound output unit 416 outputs sound of content based on sound data read from the content storage unit 404 or sound data decoded and/or decrypted by the sound decoding unit 406.

4. Operation of Management Device

The control unit 201 of the management device 20 displays a management window for managing keys used when decoding encrypted contents on the display unit 203. The control unit 201 displays an arrangement representation in the management window and provides a representation at an arrangement position defined by a playback device and content exhibited by the playback device, the representation representing the status of a key used when decoding content corresponding to the arrangement position with a playback device corresponding to the arrangement position. Moreover, the control unit 201 displays the representation of the key status so that it is possible to identify at least one of a key acquisition status and a status regarding a key valid period. Furthermore, the control unit 201 determines an urgent level based on the number of days left until an exhibition day when a valid key necessary for exhibition of contents is not present. The control unit 201 switches the properties of a representation at an arrangement position defined by content for which a valid key is not present and a playback device that exhibits the content in accordance with the urgent level so that the urgent level can be identified.

Figure 4:
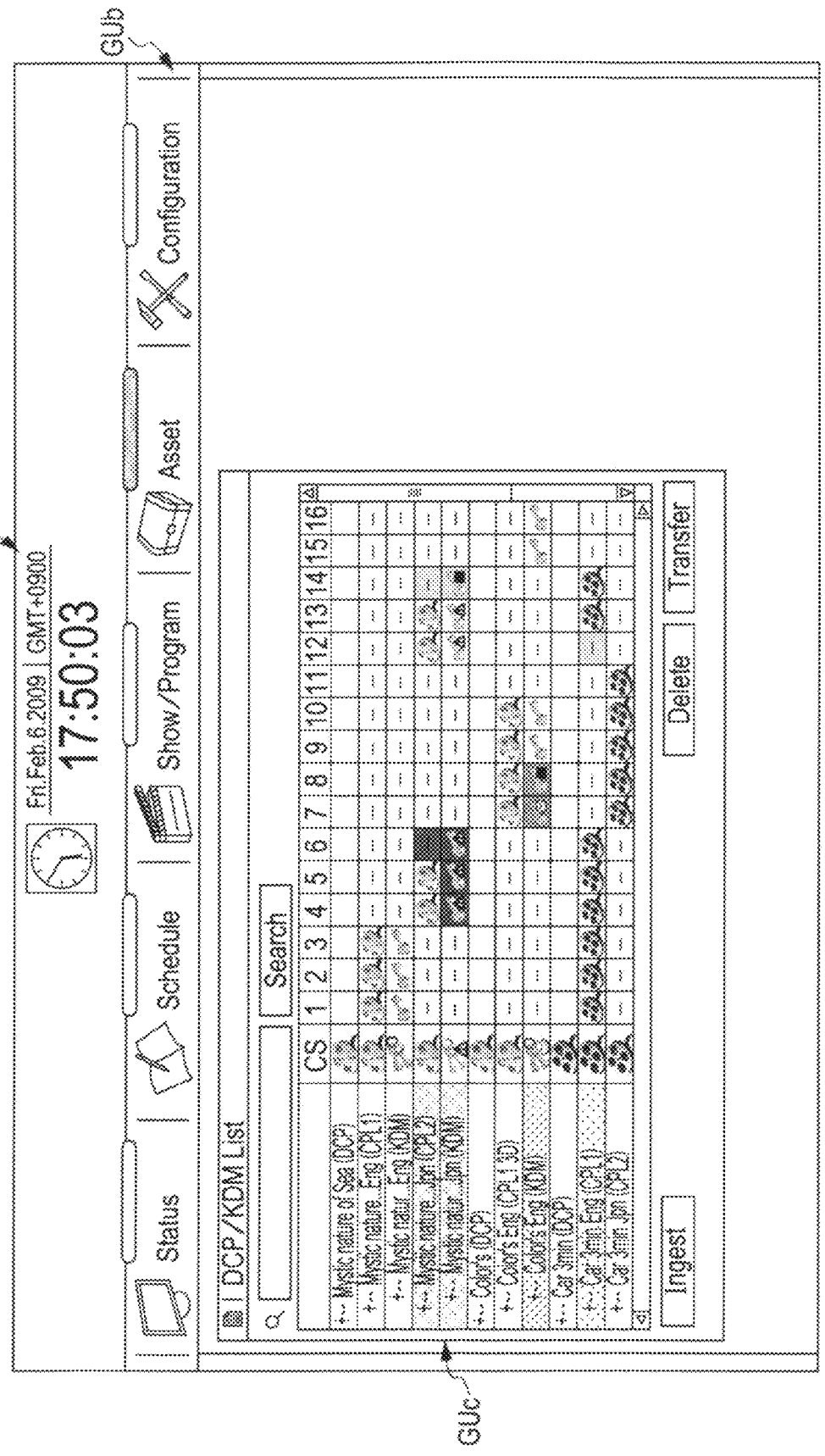
FIG. 4 is a diagram illustrating a management window for managing keys.

FIG. 4 illustrates a management window for managing keys. In the management window, an arrangement representation is displayed in which one of the playback devices and contents exhibited by the playback devices is used as column items, and the other is used as row items, for example. Moreover, in the management window, an icon is provided at an arrangement position defined by a playback device and content exhibited by the playback device, the icon representing the status of a key corresponding to content exhibited by the playback device corresponding to the arrangement position. In FIG. 4, a case of displaying an arrangement representation is illustrated in which DCPs are used as row items, and the storage device 30 and auditoriums in which the playback devices 40 are installed are used as column items. This arrangement representation is referred to as a DCP/KDM list representation.

The management window includes a representation GUa representing the current time and button representations GUb representing the menu items "Status", "Schedule", "Show/Program", "Asset", and "Configuration". Here, when the menu item "Asset" is selected, a DCP/KDM list representation GUc is displayed on the window.

The DCP/KDM list representation GUc illustrated in FIG. 4 has an arrangement representation in which the storage device and the auditoriums are used as the column items, and the contents or the keys are used as the row items. Specifically, in FIG. 4, "CS" representing the storage device and auditoriums No 1 to No 16 are illustrated as the column items. Moreover, scroll bars are included in the DCP/KDM list representation GUc so that a representation for a desired auditorium and a desired content can be displayed by operating the scroll bars.

In the DCP/KDM list representation GUc, an icon is provided at an arrangement position defined by the playback device or the like of an auditorium and content or the like to be exhibited by the playback device, the icon representing a status of content which corresponds to the arrangement position and which is played by the playback device corresponding to the arrangement position. Moreover, an icon is provided at an arrangement position defined by the playback device or the like of an auditorium and content or the like to be exhibited by the playback device, the icon representing the status or the like of a key used when decoding the content which corresponds to the arrangement position by the playback device corresponding to the arrangement position. Moreover, the properties of the DCP/KDM list representation are switched in accordance with an urgent level. For example, the background color of a corresponding representation region is switched in accordance with the urgent level.

The menu item "Status" is an item which is selected to manage the operation status or the like of individual playback devices. The menu item "Schedule" is an item which is selected to manage the exhibition schedule or the like in individual playback devices. The menu item "Show/Program" is an item which is selected to manage the show playlist, the CPL, and the like. The menu item "Configuration" is an item which is selected to perform various configurations and the like.

In the DCP/KDM list representation, the following four statuses are displayed as a content status, for example.

Content status 1: Whether or not content data are stored in the storage device 30 and the playback device 40 in each auditorium.

Content status 2: Whether or not content data are encrypted.

Content status 3: Whether or not content contains 3D pictures.

Content status 4: The urgent level of content preparation relative to a schedule.

In the DCP/KDM list representation, the following five statuses are displayed as a KDM status, for example.

KDM status 1: Whether or not a key is stored in the storage device 30 and the playback device 40 in each auditorium.

KDM status 2: Whether or not a key is valid at the current time.

KDM status 3: The status of a valid period of a key.

KDM status 4: The urgent level of key preparation relative to a schedule.

KDM status 5: The valid period of a key.

Figure 5:
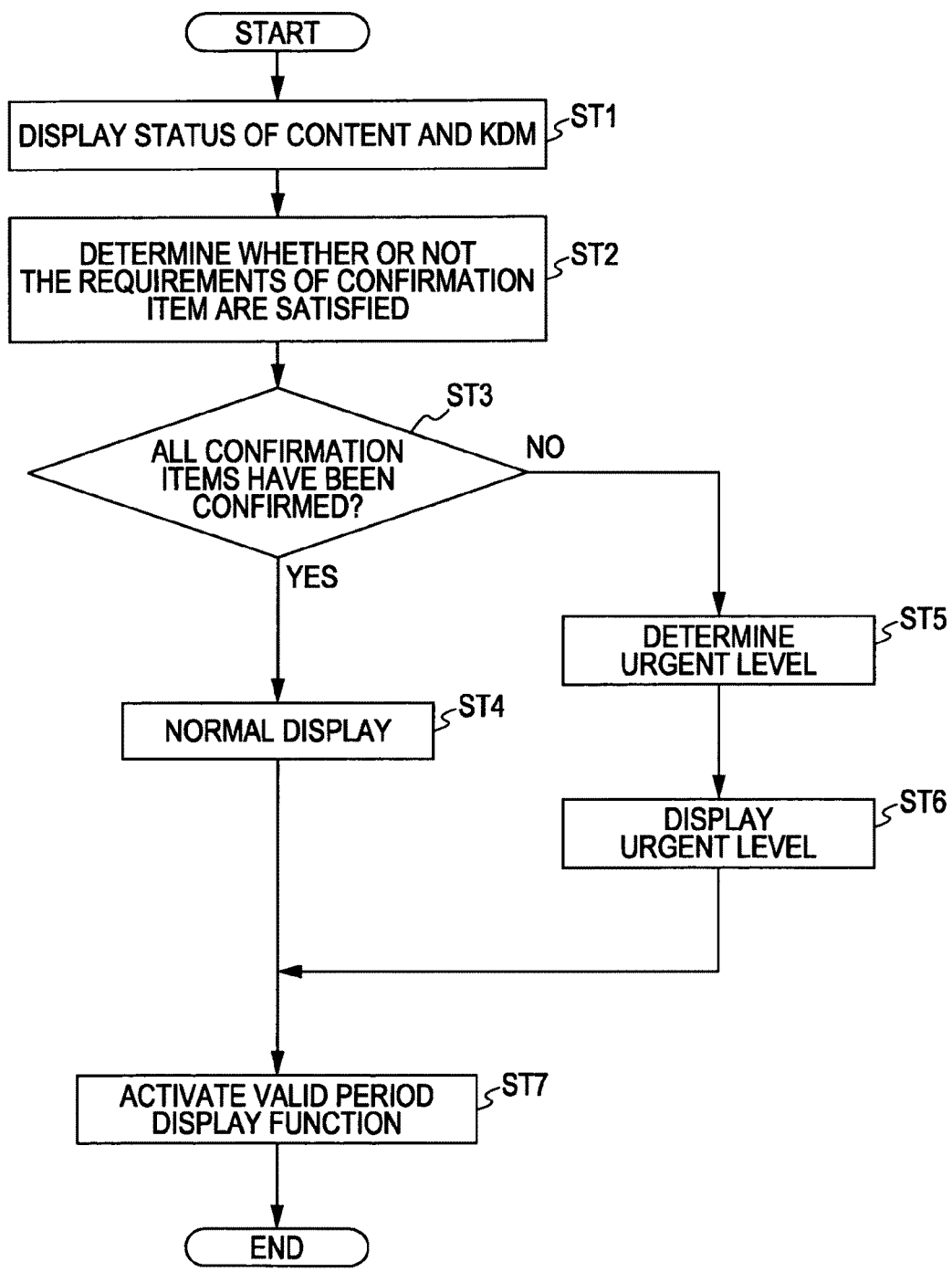
FIG. 5 is a flowchart illustrating the operation of a control unit.

FIG. 5 is a flowchart illustrating the operations of the control unit 201. At step ST1, the control unit 201 displays the statuses of contents and KDMs. The control unit 201 displays the content statuses 1 and 2 and the KDM statuses 1 to 3 using icons, for example. Moreover, the control unit 201 displays the content status 3 using a representation of a character "3D", for example, indicating that the content contains 3D pictures.

FIG. 6 illustrates icons used when displaying a content status. The control unit 201 displays an icon of a reel image when content data are stored. Moreover, the control unit 201 displays an icon of a reel image with a lock image when content data are encrypted. Furthermore, the control unit 201 displays no icon or a hyphen "-" when content is not stored.

FIG. 7 illustrates icons used when displaying a KDM status. The icons are displayed so that at least one of a key acquisition status and a status regarding a key valid period can be identified.

The control unit 201 displays an icon of a key image when a key is stored. The control unit 201 displays no icon or a hyphen "-" when a key is not stored. The control unit 201 displays the key image in a first color when the key is valid at the current time, while displaying the key image in a second color when the key is not valid at the current time. Moreover, the control unit 201 displays an icon of a key image with a clock image when the key is valid at the current time and a valid period thereof is within a hours. Furthermore, the control unit 201 displays an icon of a key image with an exclamation mark when the key is not valid at the current time and the current time is earlier than the valid period of the key. Furthermore, the control unit 201 displays an icon of a key image with an X mark when the valid period of the key has expired.

Figure 8:
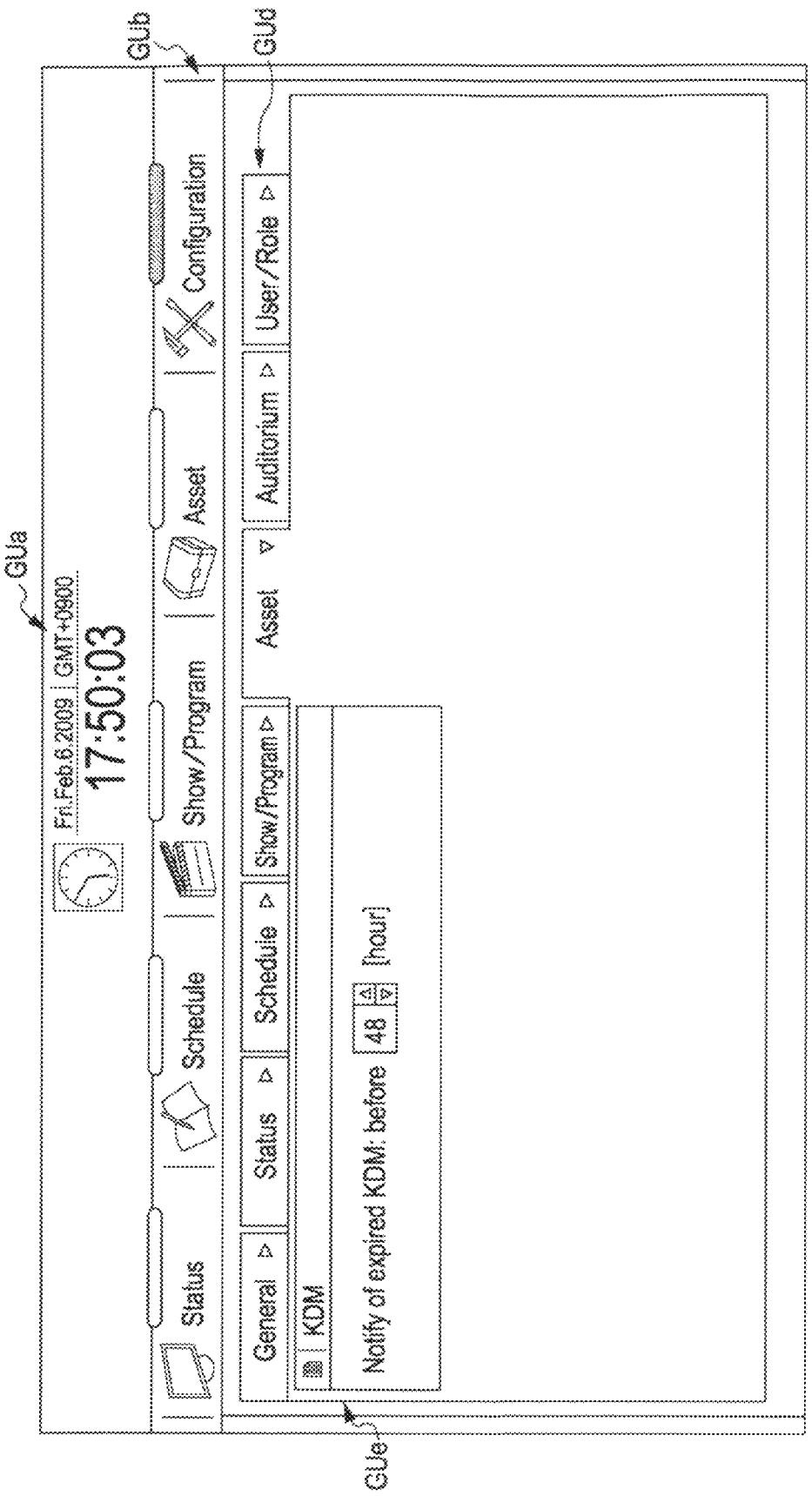
FIG. 8 is a diagram illustrating an icon switching time setting window.

In order to switch the icons when the key is valid, an icon switching time setting window is provided as illustrated in FIG. 8 so that the exhibition operator can set the a hours on the setting window.

As illustrated in FIG. 8, when the menu item "Configuration" is selected, seven tabs GUd are displayed, for example. Specifically, the tabs "General", "Status", "Schedule", "Show/Program", "Asset", "Auditorium", and "User/Role" are displayed. Here, when the "Asset" tab is selected, an icon switching time setting representation GUe is displayed on the window.

In the icon switching time setting representation GUe, an upward spin control arrow and a downward spin control arrow are provided so that the a hours can be increased or decreased by operating the spin control arrows. Therefore, the exhibition operator is able to set the a hours to the desired hours by operating the spin control arrows. The a hours may be set to the desired hours through a number input operation as well as an operation with the spin control arrows.

Figure 9:
FIG. 9 is a diagram illustrating a representation example of Content Status 3.

FIG. 9 illustrates a representation example of Content Status 3. In FIG. 9, a title display portion of the DCP in the DCP/KDM list representation is illustrated. Here, the control unit 201 inserts a character "3D" at the end of a content title when the content contains 3D pictures. For example, when CPL1 of the title "Color's" describes that it uses data of 3D content, the content is displayed with an indication of "3D" (see the position indicated by an arrow).

By displaying the statuses of contents and KDMs in this manner, a DCP/KDM list representation GUc as illustrated in FIG. 10 can be generated. In FIG. 10, a case is illustrated in which content titles and items of KDM corresponding to encrypted contents are used as column items. Therefore, by referring to the DCP/KDM list representation, a storage status of content in the storage device or individual playback devices can be easily identified for each content from the icon of the reel image. Furthermore, the encrypted contents can be easily identified from the icon of the reel image with the lock image. Furthermore, a key acquisition status in the storage device or individual playback devices can be easily identified from the icon of the key image. In addition, a key validity status can be easily identified from a difference in the icons of the key image. Although the content titles and the items of KDM corresponding to encrypted contents are separately arranged in FIG. 10 as the column items, the icon of the reel image and the icon of the key image may be arranged at one arrangement position. Moreover, the key status and the content status may be represented by one icon.

Returning now to FIG. 5, at step ST2, the control unit 201 determines whether or not the requirements of a confirmation item are satisfied. The control unit 201 determines whether the requirements of the following confirmation items are satisfied based on the content status 1 and the KDM status 1.

Confirmation item 1: Whether or not a key that is valid at an exhibition time is present in a playback device.

Confirmation item 2: Whether or not necessary content is stored in a playback device.

At step ST3, the control unit 201 determines whether or not the requirements of all the confirmation items are satisfied. When the control unit 201 has determined that the requirements of all the confirmation items have been satisfied, the process flow proceeds to step ST4. When the requirements of any of the confirmation items are not satisfied, the process flow proceeds to step ST5.

At step ST4, the control unit 201 performs a normal display. When the requirements of all the confirmation items are satisfied, the control unit 201 determines that all preparations for exhibition have been completed and changes a background color in the DCP/KDM list representation at an arrangement position defined by a playback device and content exhibited by the playback device for which the request of all the confirmation items are satisfied to a normal state. For example, the background color is changed to white so that it is possible to identify that it is in the normal state. Moreover, when the content is not scheduled for exhibition, the background color is changed to white because the content is not related to an urgent level.

At step ST5, the control unit 201 determines an urgent level. The control unit 201 determines the urgent level based on the number of days left until the exhibition day by using a check table.

FIGS. 11A and 11B illustrate check tables. FIG. 11A illustrates a DCP check table. The DCP check table is a check table which is used for determining the urgent level when the requirements of the confirmation item 2 are not satisfied. FIG. 11B is a KDM check table. The KDM check table is a check table which is used for determining the urgent level when the requirements of the confirmation item 1 are not satisfied.

In FIGS. 11A and 11B, three statuses, "Fatal Status", "Error Status" and "Warning Status" are set as the status concerning the urgent level, in which the "Fatal Status" is set with Urgent Level 3, the "Error Status" is set with Urgent Level 2, and "Warning Status" is set with Urgent Level 1. The "Fatal Status" is a state where it is necessary to take immediate measures so that no problem is caused to an exhibition. The "Warning Status" is a state where a problem may be caused to an exhibition unless appropriate measures are taken even though no immediate measures are necessary. The "Error Status" is an intermediate state between "Fatal Status" and "Warning Status" and is a state where an operator is able to make preparations for an exhibition.

In the check tables, a threshold value (number of days) is set so that it is possible to identify whether a present status corresponds to any of the three statuses "Fatal Status", "Error Status", and "Warning Status". The present status is identified based on a comparison result between the set threshold value and the number of days left until the exhibition day, and the urgent level is determined based on the determination result.

Various processing times are necessary until the content data are stored in the playback device 40. For example, the time until the content data arrive at a theater, the time for copying the content data to the storage device 30, and the time for transferring and storing the content data from the storage device 30 to the playback device 40 are necessary. Therefore, the threshold values Md and Nd in the DCP check table illustrated in FIG. 11A are set in consideration of these times. For example, when the day on which the content data arrive at a theater is 4 to 5 days ahead of the exhibition starting day, the threshold values in the DCP check table are set as "Md=2" and "Nd=5".

When these threshold values Md and Nd are set to such values and the requirements of the confirmation item 2 are not satisfied, the urgent level for the present status is determined as Urgent Level 1 if the current time is 5 days or more before the exhibition day as illustrated in FIG. 12A. Moreover, the urgent level for the present status is determined as Urgent Level 2 if the current time is between 5 and 3 days before the exhibition day. Furthermore, the urgent level for the present status is determined as Urgent Level 3 if the current time is 2 days or less before the exhibition day.

Similar to the content data, various processing times are necessary until a key is stored in the playback device 40. For example, the time until the key arrives at a theater, the time for copying the key to the storage device 30, and the time for transferring and storing the key from the storage device 30 to the playback device 40 are necessary. Therefore, the threshold values Mk and Nk in the KDM check table illustrated in FIG. 11B are set in consideration of these times. For example, when the day on which the key arrives at a theater is 2 to 3 days ahead of the exhibition starting day, the threshold values in the KDM check table are set as "Mk=2" and "Nk=3".

When these threshold values Mk and Nk are set to such values and the requirements of the confirmation item 1 are not satisfied, the urgent level for the present status is determined as Urgent Level 1 if the current time is 3 days or more before the exhibition day as illustrated in FIG. 12B. Moreover, the urgent level for the present status is determined as Urgent Level 2 if the current time is 3 days before the exhibition day. Furthermore, the urgent level for the present status is determined as Urgent Level 3 if the current time is 2 days or less before the exhibition day.

Figure 13:
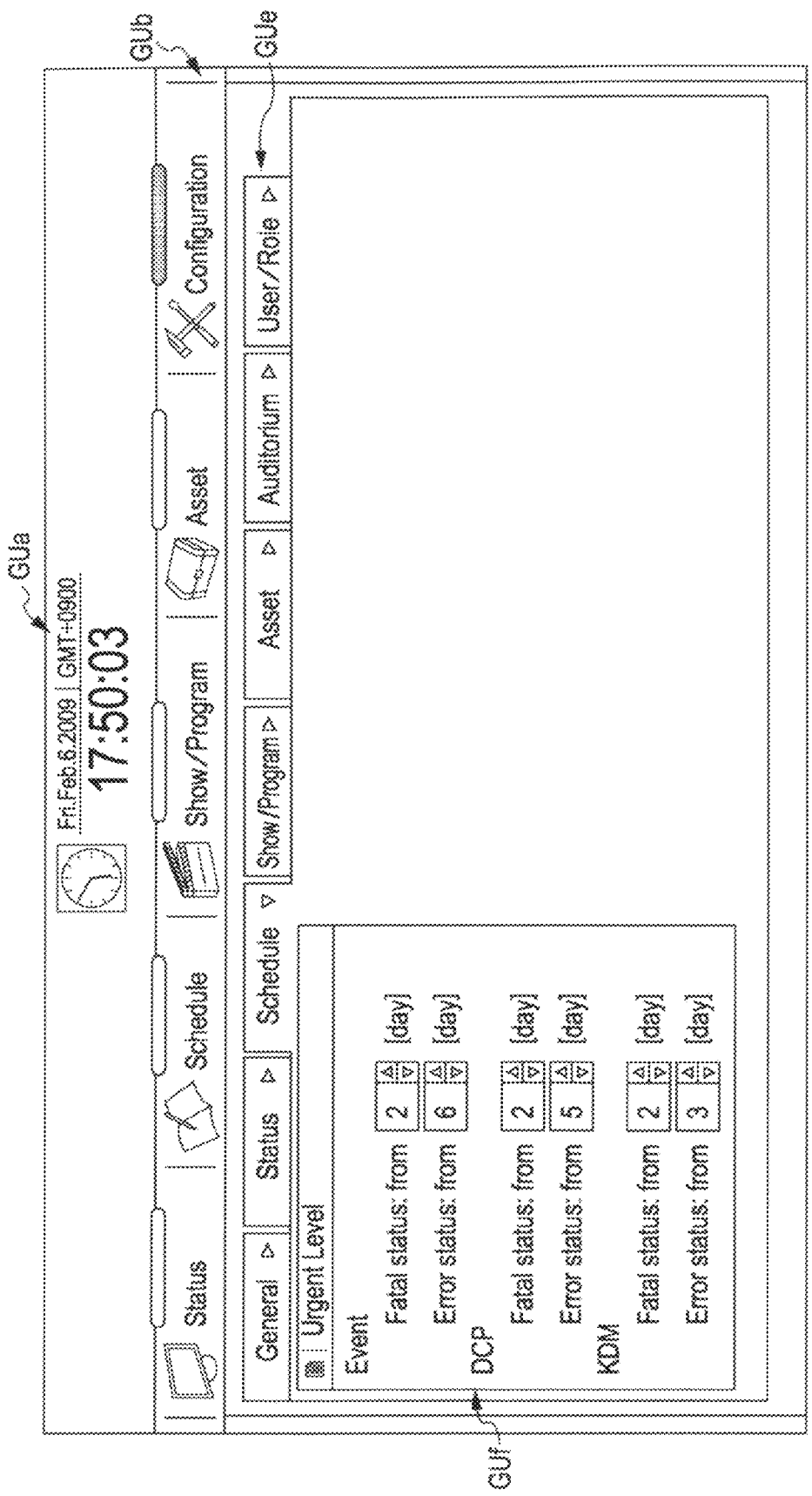
FIG. 13 is a diagram illustrating an urgent level setting representation.

FIG. 13 illustrates an urgent level setting representation. In the urgent level setting representation, the threshold values Md and Nd in the DCP check table and the threshold values Mk and Nk in the KDM check table can be set.

As illustrated in FIG. 13, when the menu item "Configuration" is selected, the above-described seven tabs GUd are displayed. Here, when the "Schedule" tab is selected, the urgent level setting representation GUf is displayed on the window.

In the urgent level setting representation GUf, an upward spin control arrow and a downward spin control arrow are provided for each of the threshold values Md and Nd in the DCP check table and each of the Mk and Nk in the KDM check table. Moreover, in the urgent level setting representation GUf, the threshold value can be increased or decreased by operating the spin control arrows. Therefore, the exhibition operator is able to set the threshold value to a desired number of days by operating the spin control arrows. The threshold value may be set through a number input operation as well as operation with the spin control arrows. In FIG. 13, "DCP Fatal Status" corresponds to the threshold value Md, and "DCP Error Status" corresponds to the threshold value Nd. Furthermore, "KDM Fatal Status" corresponds to the threshold value Mk, and "KDM Error Status" corresponds to the threshold value Nk.

In this way, the control unit 201 determines the urgent level for content preparation in the content status 4 and the urgent level for key preparation in the KDM status 4.

Returning now to FIG. 5, at step ST6, the control unit 201 displays the urgent level based on the urgent level determined at step ST5. The control unit 201 switches the properties of the representation in accordance with the urgent level so that the urgent level can be identified in the DCP/KDM list representation. FIG. 14 illustrates switching of representation properties based on the urgent level. For example, the background color of the representation is switched in accordance with the urgent level. In FIG. 14, the background color for the urgent level 3 is set to "Red", the background color for the urgent level 2 is set to "Orange", and the background color for the urgent level 1 is set to "Yellow". In addition, when it is unable to determine the urgent level due to communication errors, the events are displayed with gray, for example, which is different from the color corresponding to the normal state and the urgent level so that it is possible to identify that it is in an indefinable state.

At step ST7, the control unit 201 activates a valid period display function. When an icon of a key image is selected in the DCP/KDM list representation, the control unit 201 activates a valid period display function of displaying a valid period of a key corresponding to the selected icon, and the process flow ends.

Figure 15:
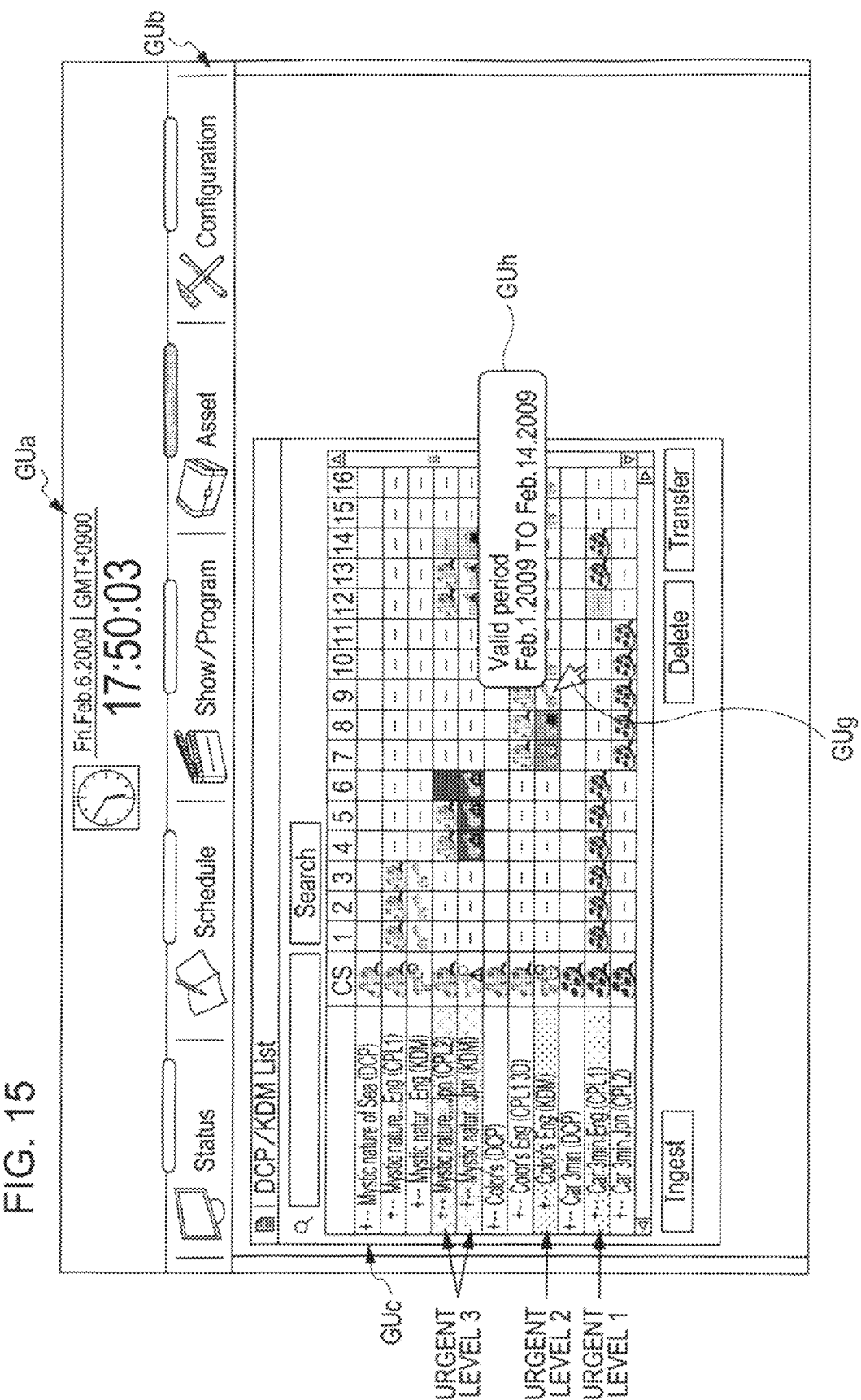
FIG. 15 is a diagram illustrating a DCP/KDM list representation when an urgent level and a valid period are displayed together.

FIG. 15 is a diagram illustrating a DCP/KDM list representation when an urgent level and a valid period are displayed together. The control unit 201 provides a representation at an arrangement position defined by a playback device and content exhibited by the playback device, the representation representing the status of a key used when decoding content corresponding to the arrangement position with a playback device corresponding to the arrangement position and the status of the content. Moreover, the control unit 201 switches a background color at the arrangement position in accordance with the urgent level determined for the key or the content. Furthermore, when a cursor representation is positioned at the position of the icon of the key image, a valid period of a key corresponding to the position of the cursor representation GUg is represented by a balloon representation GUh, for example.

By displaying the DCP/KDM list representation in this manner, it is easily possible to manage the key status, namely an acquisition status, a status regarding a valid period, and the like. Moreover, when the content status is displayed together, it is possible to manage the contents as well as the keys. Furthermore, by switching the properties of the representation in accordance with the urgent level, it is easily possible to identify contents or keys of which immediate measures are necessary. That is to say, it is possible to perform key or content preparations in accordance with a priority. Furthermore, since operations necessary for being done can be identified from the schedules by the different colors of the urgent levels at a glance, it is possible to reduce operation errors.

The digital cinema management device and the digital cinema management method according to the embodiment of the present invention may be implemented by a computer device. In this case, a computer program for causing the computer device to function as the digital cinema management device may be provided, for example, in a computer-readable format to a general computer system capable of executing various computer codes. For example, the computer program may be provided in the form of a storage medium such as an optical disc, a magnetic disc, or a semiconductor memory, or a communication medium such as a network. By providing the computer program in the computer-readable format, processing corresponding to the computer program is executed on the computer device, whereby the described digital cinema management device and digital cinema management method can be implemented.

It should be understood by those skilled in the art that various modifications, combinations, sub-combinations and alterations may occur depending on design requirements and other factors insofar as they are within the scope of the appended claims or the equivalents thereof.

What is claimed is:

1. A digital cinema management device comprising:
a control unit that manages keys used when exhibiting contents with a number of playback devices and controls a representation of a management window for performing key management; and
a connection port, wherein:
the control unit causes an arrangement representation in the management window to be displayed and a representation at an arrangement position defined by a playback device, of the number of playback devices, and content exhibited by the playback device to be provided, the representation representing (i) a key status of a key used when decoding content corresponding to the arrangement position with the playback device corresponding to the arrangement position, and (ii) a content status of the content, such that the management window is caused to display both the key status and the content status, in which the key status is selected from a first key status indicative of whether or not the key is stored in the playback device, a second key status indicative of whether or not the key is valid at a current time, and a third key status indicative of a status of a valid period of the key, and
the control unit (i) determines a key urgent level for the key and a content urgent level for the content, each of the key urgent level and the content urgent level being respectively selected from three different levels which are each based on a respective number of days left until an exhibition day, and (ii) causes the determined key urgent level and the content urgent to be displayed,
in which the three different levels for the key urgent level include a first key level corresponding to a first key number of days until the exhibition day, a second key level corresponding to a second key number of days until the exhibition day, and a third key level corresponding to a third key number of days until the exhibition day, in which the first key number, the second key number and the third key number are different from each other, and
in which the three different levels for the content urgent level include a first content level corresponding to a first content number of days until the exhibition day, and a second content level corresponding to a second content number of days until the exhibition day, and a third key level corresponding to a third content number of days until the exhibition day, in which the first content number, the second content number and the third content number are different from each other;
wherein the connection port provides the keys to at least one of the playback devices; and
the at least one of the playback devices decodes each of the contents having a specific content urgent level with a corresponding key of a specific key urgent level and displays the contents thereat.

2. The digital cinema management device according to claim 1, wherein the plurality of key statuses includes a fourth key status indicative of the key valid period.

3. The digital cinema management device according to claim 1, wherein the control unit switches a background color of an urgent level display in accordance with the urgent level.

4. The digital cinema management device according to claim 1, wherein when a representation representing the key status is selected, the control unit displays a valid period of a key corresponding to the selected representation on the management window.

5. The digital cinema management device according to claim 1, wherein:
the management window displays an arrangement representation in which one of the playback devices and the contents exhibited by the playback devices are column items and the other of the playback devices and the contents are row items; and
the control unit provides an icon at the arrangement position defined by the playback device and the content exhibited by the playback device, the icon representing the key status corresponding to content that is exhibited by a playback device corresponding to the arrangement position.

6. The digital cinema management device according to claim 1, in which the control unit causes a first icon representing the key status and a second icon representing the content status to be displayed in the management window.

7. The digital cinema management device according to claim 6, in which the management window displays an arrangement representation in which one of the playback devices and the contents exhibited by the playback devices are column items and the other one of the playback devices and the contents are row items.

8. The digital cinema management device according to claim 1, in which the content status is selected from one of a plurality of content statuses which include a first content status indicative of whether or not the content data is encrypted.

9. The digital cinema management device according to claim 8, in which the plurality of content statuses include a second content status indicative of whether or not the content data includes 3D picture data.

10. The digital cinema management device according to claim 1,
in which at least one of the first key number, the second key number and the third key number is respectively different from the first content number, the second content number and the third content number.

11. A digital cinema management method comprising the steps of:
displaying on a display unit a management window for managing of keys used when decoding contents with a number of playback devices;
providing, by a connection port, the keys to at least one of the playback devices;
controlling a control unit to display an arrangement representation in the management window and provide a representation at an arrangement position defined by a playback device, of the number of playback devices, and content exhibited by the playback device, the representation representing (i) a key status of a key used when decoding content corresponding to the arrangement position with the playback device corresponding to the arrangement position, and (ii) a content status of the content, such that the management window is caused to display both the key status and the content status, in which the key status is selected from first key status indicative of whether or not the key is stored in the playback device, a second key status indicative of whether or not the key is valid at a current time, and a third key status indicative of a status of a valid period of the key;
determining a key urgent level and a content urgent level, each of the key urgent level and the content urgent level being respectively selected from three different levels which are each based on a respective number of days left until an exhibition day and causing the determined key urgent level and the content urgent level to be displayed,
in which the three different levels for the key urgent level include a first key level corresponding to a first key number of days until the exhibition day, a second key level corresponding to a second key number of days until the exhibition day, and a third key level corresponding to a third key number of days until the exhibition day, in which the first key number, the second key number and the third key number are different from each other, and
in which the three different levels for the content urgent level include a first content level corresponding to a first content number of days until the exhibition day, and a second content level corresponding to a second content number of days until the exhibition day, and a third key level corresponding to a third content number of days until the exhibition day, in which the first content number, the second content number and the third content number are different from each other; and
the at least one of the playback devices decodes each of the contents having a specific content urgent level with a corresponding key of a specific key urgent level and displays the contents thereat.

* * * * *